United States Patent [19]

Blanchard et al.

[11] Patent Number: 4,588,497

[45] Date of Patent: May 13, 1986

[54] PROCESS FOR THE CATALYTIC REFORMING OR AROMATIC HYDROCARBONS PRODUCTION

[75] Inventors: Gilbert Blanchard, Le Plessis Belleville; Jean-Pierre Franck, Bougival, both of France

[73] Assignee: Societe Francais des Produits pour Catalyse Pro-Catalyse chez Institut Francais du Petrole, Rueil-Malmaison, France

[21] Appl. No.: 679,665

[22] Filed: Dec. 7, 1984

[30] Foreign Application Priority Data

Dec. 9, 1983 [FR] France .................................. 83 19716

[51] Int. Cl.$^4$ .................................................. C10G 35/06
[52] U.S. Cl. ..................................... 208/138; 208/139; 502/439
[58] Field of Search ................ 208/139, 138; 502/333, 502/334, 335, 336, 439

[56] References Cited

U.S. PATENT DOCUMENTS

| | | | |
|---|---|---|---|
| 3,549,556 | 12/1970 | Dienes | 502/335 |
| 3,554,929 | 1/1971 | Aarons | 502/332 |
| 3,669,904 | 6/1972 | Cornelius et al. | 502/334 |
| 3,787,333 | 1/1974 | Ichihara et al. | 502/314 |
| 3,928,238 | 12/1975 | Koberstein et al. | 502/332 |
| 4,401,557 | 8/1983 | Juquin et al. | 208/139 |

*Primary Examiner*—Curtis R. Davis
*Attorney, Agent, or Firm*—Millen & White

[57] ABSTRACT

The invention concerns a catalytic reforming process, operated in the presence of a catalyst containing a carrier formed in major part of alumina and an active phase, the alumina carrier being obtained by admixing an alumina binding agent with a charge of alumina base.

At least a portion of the active phase or its precursor is introduced during the manufacture of the carrier, either in the binding agent or in the charge, during the admixture of the charge with a binding agent.

15 Claims, No Drawings

PROCESS FOR THE CATALYTIC REFORMING OR AROMATIC HYDROCARBONS PRODUCTION

The present invention concerns a process for catalytic reforming or for the production of aromatic hydrocarbons in the presence of an alumina catalyst containing an active phase generally comprising at least one metal from group VIII of the periodic classification of elements and at least one additional metal used as promoter.

BACKGROUND OF THE INVENTION

Generally, in the prior art, the catalyst is prepared in two steps:
(a) the carrier is prepared or bought on the market,
(b) an activating phase is then deposited on the carrier. It contains generally (α) at least one metal mostly from group VIII of the periodic classification of elements, generally present in the catalyst as metal or for example as oxide or sulfide and (β) optionally at least one so-called additional metal or (or promoter) from any group of the periodic classification of elements, generally present in the catalyst as oxide or sulfide for example.

According to the prior art, several metals may be used to incorporate the active phase of the catalyst into the carrier:

Generally, each metal individually or all the metals together may be incorporated to the carrier by means of a suitable method, consisting in a co-precipitation or cogelation with the porous carrier or in ionic exchange with the gelated carrier or also in an impregnation of the carrier, either before or after the drying and roasting of the latter.

SUMMARY OF THE INVENTION

Generally, the invention concerns a process for manufacturing a catalyst comprising an active phase consisting of at least one metal of the platinum family and at least one additional metal and a carrier obtained by admixture of a binding agent with a charge, the process comprising the following steps:

(1) admixture of a charge, a binding agent and at least a portion of the active phase,
(2) shaping of the mixture,
(3) drying and optionally roasting,
(4) optional introduction of the remaining portion of active phase, followed with a drying and then an activation.

In said process the major part of the metals of the platinum family and/or the major part of the additional metals are introduced either in the binding agent or in the charge during the first step.

According to the present invention, the catalyst carrier is prepared from an aqueous alumina composition. Said carrier comprises a binding agent essentially constituting the dispersed part and a charge essentially constituting the non dispersed part of the composition. Preferably, the dispersion rate of the water of the composition, resulting from the admixture of the binding agent with the charge, ranges from about 10 to 60% and, for certain applications of the catalysts, the granulometry of the non dispersed part of the composition may be further so selected that the average diameter of the alumina particles of which it is formed ranges from 1 to 15 microns, at least 70% of said particles having an average diameter comprised between half the average diameter and twice said average diameter.

The dispersion rate is represented by the proportion of alumina remaining in total colloidal suspension after the composition has been subjected to centrifugation. This dispersion rate may be measured as follows: the alumina aqueous composition is diluted so as to obtain a total alumina concentration of 100 g/l; 100 cc or said solution are subjected to vigorous stirring for 10 minutes; the solution is then centrifuged for 10 minutes at a running speed of 3000 runs per minute; the settled part is separated from the unsettled part formed of alumina colloidal suspension. After roasting, the settled part is weighed; the dispersion rate is expressed as the ratio between the initial total alumina amount of the composition less the settled alumina amount, in proportion to the total initial alumina amount of the composition.

According to the present invention, the dispersion rate in water of the aqueous alumina composition is preferably 10–100%, more particularly 15–40%, the granulometry of the non dispersed part of the composition is such that the average diameter of the alumina particles of which it is formed ranges preferably from 1 to 15 microns.

The non dispersed part of the composition consists essentially of the charge; a minor fraction thereof may come from the binding agent.

The binding agent proportion of the composition weight (total weight of the carrier) is preferably 10–60% and more particularly 15–40%. Accordingly, the proportion by weight of the charge in the composition is 40–90%; more particularly 60–85%.

According to the invention, the alumina binding agent consists essentially of a portion of dispersed alumina and optionally a minor portion of non dispersed alumina, the dispersed portion amounting preferably to at least 70% by weight of the binding agent. Hereinafter, the term binding agent will be used to designate the dispersed portion (even if all the binding agent is not dispersed) and the term charge will designate the non dispersed portion (even if a portion of the charge, smaller than 10% by weight, is in dispersed state).

The invention concerns a process for catalytic reforming or aromatic hydrocarbons production, in the presence of a catalyst containing (a) a carrier, the major part of which is formed of alumina and (b) an active phase, the alumina carrier used for the manufacture of the catalyst being obtained by admixture, shaping, drying and roasting of an alumina binding agent and an alumina charge. The manufacture of the catalyst is remarkable in that at least a portion of the active phase has been introduced during the manufacture of the carrier, so that said active phase is to be found in major part in the binding agent or in major part in the charge or both in the charge and in the binding agent before or during the admixture of the charge with the binding agent. The method consists, for example, of introducing at least a portion of the active phase, mostly in the binding agent or mostly in the charge during the admixture of the charge with the binding agent.

According to an alternative embodiment of the process, the alumina charge (in view of improving its thermal stability) may be at least partially replaced with an oxide selected from the group consisting of magnesium, calcium, strontium, barium, scandium, yttrium, lanthanides, gallium, indium, thallium, boron, silicium, titanium, zirconium, hafnium, thorium, germanium, tin, lead, vanadium, niobium, tantalum, chromium, molybdenum, tungsten, rhenium, iron, cobalt, nickel, copper, zinc and bismuth oxides.

The invention concerns catalytic reforming processes as well as catalytic processes for manufacturing aromatic hydrocarbons, said processes being conducted, for example, at a temperature of 430°–600° C. under an absolute pressure of 0.1–5 MPa with a hourly velocity of 0.1–10 volumes of liquid charge per volume of catalyst, the molar ratio hydrogen/hydrocarbons being 1–20.

The catalysts used in these reactions contain a carrier, generally alumina, wherein has been introduced a so-called active phase based on at least one metal of the periodic classification of elements and mostly, since about 20 years, two metals or more.

Thus, specific catalysts suitable for the above-mentioned processes, are catalysts containing an alumina carrier and critical amounts of various adequate metal elements (metals or metal compounds). Thus, for example, specific catalysts are those which generally contain the following additive proportions by weight with respect to the alumina carrier:

(a) 0.05–2% of at least one precious metal selected from platinum, palladium, iridium, ruthenium, rhodium and osmium (preferably platinum, iridium, ruthenium and rhodium) or 0.1–30% of at least one metal selected from iron, cobalt and nickel.

(b) Optionally 0.01–25% of at least one second metal selected for example, from titanium, rhenium, tin, germanium, indium, thallium, manganese or still copper, silver, gold, niobium, lanthanum, cerium, samarium and other metals of the rare-earth family, zirconium, thorium, hafnium, lead, gallium, vandium, uranium, chromium, molybdenum, tungsten, zinc, cadmium, bismuth, antimony, etc . . . and (c) still optionally, for certain reactions, 0.1–10% of halogen, for example, chlorine or fluorine.

Such catalysts, largely used in the prior art, have been progressively improved with respect to one another by using a specific metal promoter at a particular critical concentration and have resulted in often remarkable results in the above-listed reactions, as far as the yields and the reaction selectively in particular as well as the stability, and hence the lifetime of the catalyst, are concerned.

It has now been observed that with the same catalyst (i.e. a catalyst containing an alumina carrier and identical contents of active metals) the yield and the selectivity of the reaction for which it is used, as well as the stability and the life-time of the catalyst, may be increased. These improvements result from a particular method of catalyst manufacture. Thus, for example in the reforming reactions, a yield improvement of only 0.1% by weight, would result in substantial gain of gasoline, which may be determined as follows:

An industrial unit of average size operating with a VVH of 1.65 (naphtha volume/catalyst volume/hour) requires about 50 tons of catalyst. This means that the unit is operated with:

|   |   |   |   |
|---|---|---|---|
|   | 40 × 1.65 | = | 66 tons of charge per hour, |
| i.e. | 66 × 24 | = | 1 584 tons of charge per day, |
| i.e. | 1 584 × 365 | = | 578 160 tons of charge per year. |

A yield by weight of 75% would result in an annual production of:

578,160 × 75/100 = 433,620 tons of gasoline.

A mere increase of only 0.1% of the yield would result in an annual production of:

578,160 × 75.1/100 = 434,198.16 tons of gasoline.

This increase, although of relatively small amount, of the yield, would hence result in an annual gain of 434,198.16−433,620 = 578.16 tons of gasoline (i.e. 770.88 t of charge corresponding to more than 3000 t of crude oil). This is far from being negligible; thus showing the interest of any new method of catalyst manufacture.

The particular method of catalyst manufacture also provides catalysts which can be used in severe operating conditions. Thus, more particularly, the use of catalysts prepared in conformity with the present invention is particularly adapted to the reforming reactions, in view to obtain a gasoline of clear octane number of at least 100, for example, or to obtain aromatic hydrocarbons. The severe conditions of catalytic hydroreforming reactions are more particularly the following: average temperature of about 480°–580° C., pressure of about 0.5–1.8 MPa (5–18 kg/cm2) preferably 0.6–1.3 MPa, hourly velocity of 1–10 volumes of liquid charge per volume of catalyst and recycle rate of 4–10 moles of hydrogen per mole of charge. The charge is generally a naphtha distilling between about 60° and about 200° C., particularly a straight-run naphtha.

Preferred catalysts according to the invention are particularly those containing:

platinum, platinum and iridium, platinum and at least one metal selected from the group consisting of titanium, rhenium, tin, germanium, indium, thallium, manganese, nickel, iron, cobalt, zinc, copper, gold, silver, niobium, lanthanum, cerium, samarium, zirconium, thorium, hafnium, lead, gallium, vanadium, technetium, uranium and selenium.

platinum, iridium and tin, platinum, iridium and selenium, platinum, iridium and germanium, platinum, iridium and thallium, platinum, iridium and indium, platinum, iridium and titanium, platinum, iridium and rhenium, platinum, iridium and manganese, platinum, iridium, copper, gold or silver platinum, rhenium and at least one of the above-listed metals, platinum, germanium and at least one of the above-listed metals, platinum, tin and at least one of the above-listed metals, platinum, indium or thallium and at least one of the above-listed metals.

According to the invention, the alumina binding agent is present as powder.

The alumina binding agent must be gelatable or coagulable by thermal or chemical effect.

The gelation or coagulation effect by thermal effect is well known in the art and may be obtained by evaporation of water from the aqueous suspension or dispersion of alumina forming the binding agent. The gelation or coagulation by chemical effect is also well known in the art and may be obtained by increasing the pH of the aqueous suspension or dispersion of the alumina forming the binding agent, up to a value higher than 9, which corresponds to the isoelectric point of alumina.

Alumina binding agents used according to the invention are particularly the aqueous suspensions or dispersions of fine or ultra-fine boehmites which are formed of particles of a size within the colloidal range, i.e. lower than about 2000 Å.

The aqueous dispersions or suspensions of fine or ultra-fine boehmites may be obtained, as well known in the art, by peptization of these products in water or acidulated water. The fine or ultra-fine boehmites used according to the invention may particularly be obtained by the process disclosed in the French Pat. Nos. 1 262 182 and 1 381 282 or in the European patent application No. 15 196.

The French Pat. No. 1 262 282 discloses particularly a process for manufacturing fine or ultra-fine boehmite by heating an aqueous alumina dispersion in the presence of a monovalent acid radical, the alumina aqueous dispersion being obtained from aluminum basic chloride, aluminum basic nitrate, aluminum hydroxide, alumina gel or colloidal solutions. This product, sold on the market by Du Pont de Nemours, under trade mark Baymal, is a fine or ultra-fine fibrillar boehmite of 250-350 m2/g specific surface.

The French Pat. No. 1 381 282 discloses in particular a process for manufacturing fine or ultra-fine boehmite consisting of subjecting to a temperature within 60°-150° C. a suspension or cake of amorphous hydrated alumina gel, containing up to 35% by weight of alumina as $Al_2O_3$, and, per $Al_2O_3$ mole of said alumina, from 0.05 to 0.5 monovalent acid ions, during 15 hours to 10 days. The cake was obtained by drying, washing and filtering the alumina gel, continuously precipitated at a pH from 8 to 9, from a solution of sodium hydroxide aluminate and nitric acid. The specific surface of these products generally varies from 200 to 600 m2/g.

The European patent application No. 15 196 discloses in particular a process for manufacturing boehmite, at least partially as ultrafine boehmite, by treating in aqueous medium of pH lower than 9, an active alumina powder obtained by quick dehydration of hydrargillite in a hot gas stream.

As binding agent for alumina, aqueous suspensions or dispersions obtained from pseudo-boehmite, amorphous alumina gels, aluminum hydroxide gels or ultra-fine hydrargillite, can be used. The pseudo-boehmite may particularly be prepared according to the process disclosed in the U.S. Pat. No. 3,360,670 by reacting an alkaline aluminate solution with a solution of inorganic acid. It may also be prepared, as disclosed in the French Pat. No. 1 357 830, by precipitation, at pH 9, at a temperature slightly higher than room temperature, from reactants at such concentrations that about 50 g/l of alumina are obtained in the dispersion.

Amorphous alumina gels may particularly be prepared according to the processes disclosed in "Alcoa paper" No. 19 (1972)—pages 9-12 and particularly by reacting aluminate with acid or an aluminum salt with a base or an aluminate with an aluminum salt or by hydrolysis of aluminum basic salts, or of aluminium alcoholate obtained by reacting aluminum with alcohol.

The aluminum hydroxide gels may particularly be those prepared according to the U.S. Pat. Nos. 3,268,295 and 3,245,919.

Ultra-fine hydrargillite may particularly be prepared according to the process disclosed in the French Pat. No. 1 373 808, by subjecting alumina gels, as cake containing 0.10 monovalent acid ions per $Al_2O_3$ molecule of alumina to a temperature from room temperature to 60° C.

According to an alternative embodiment of the process of the invention, the alumina binding agent may at least be partially replaced with a silica suspension or dispersion having the same characteristics as the alumina binding agent.

According to the invention, the alumina charge consists essentially of a non dispersable alumina portion optionally with a minor portion of dispersable alumina, which is dispersed in the composition, the non dispersable portion amounting to at least 90% by weight of the charge. It may be preferable that the granulometry of the non dispersed portion of the composition, which is essentially formed of the charge, be such that the average diameter of the alumina particles of which it is formed, be 1-15 microns.

The alumina charge may be any alumina compound having the above-stated characteristics, particularly the alumina hydrated compounds such as: hydragillite, bayerite, boehmite, pseudoboehmite and amorphous or substantially amorphous alumina gels, optionally in the dehydrated or partially dehydrated form of these compounds, which consist of transition aluminas and comprise at least one of the phases selected from the group consisting of rhô, chi,êta, gamma, kappa, thêta, delta and alpha aluminas.

In particular, convenient alumina charges will be those obtained by one of the following processes, optionally after crushing and screening of the particles:

An aqueous solution of the aluminum salt is precipitated with a solution of alkaline aluminate. The obtained precipitate is atomized and then suspended again in an aqueous solution of pH from 4.5 to 7. The resultant alumina mixture is atomized and dried; then the obtained product is washed, dried and calcined (Process disclosed in U.S. Pat. No. 3,520,654).

An alumina gel is precipitated at a pH from 7.5 to 11, then washed, dried, again suspended and the product is quickly dehydrated in a hot gas stream at an inlet temperature of 350°-1000° C. and then calcined (Process disclosed in French Pat. No. 2 221 405).

An alumina gel is precipitated at a pH from 7 to 10.5, the precipitate is matured at a pH from 10 to 11, the obtained mixture is homogenized and atomized at 250°-550° C. and then calcined (Process disclosed in British Pat No. 888 772).

An alkaline aluminate is precipitated with an inorganic acid at a temperature from 30° to 75° C. The resultant mixture is matured in a second reactor at 35°-70° C., at a pH close to 7, recycled to the mixing reactor, and the product is filtered, washed, dried by atomization and calcined (Process disclosed in U.S. Pat. No. 3,630,670).

Aluminum hydroxides or oxyhydroxides and more particularly hydrargillite, are quickly dehydrated in a stream of hot gases. This dehydration is performed in any convenient apparatus, by means of a hot gas stream, the inlet temperature of the gases in the apparatus generally varying from 400° to about 1200° C., the contact time of the hydroxide or oxyhydroxide with the hot gases being generally from a fraction of second to 4-5 seconds. Such a process of manufacturing active alumina powder has been disclosed particularly in the French Pat. No. 1 108 011.

An active alumina powder obtained by quick dehydration of hydrargillite in a stream of hot gases, drying by atomization and then calcination, has been treated in an aqueous medium of pH lower than 9 (Process disclosed in the European patent application No. 15 196).

The alumina charges obtained according to the various processes may be classified in two groups. The first group concerns charges obtained after drying and optionally calcination, which have a certain dispersion rate.

These products can be used as such for the charge, optionally after crushing and screening. The second group concerns charges obtained after drying, which have a dispersion rate lower than that of the charges of the first group. These charges need, before use, to be calcined at a temperature higher than 300° C., optionally after crushing and screening.

In the process of the invention, the binding agent and/or the alumina charge may be at least partially replaced with an oxide selected from the group consisting of at least one of the metals, above called promoters, or additional metals.

According to the prior art, the charge and the binding agent may be admixed as powders. The powdered binding agent may consist of various products: boehmite, pseudo-boehmite, bayerite, amorphous alumina gels, aluminum hydroxide gels, ultra-fine hydrargillite in non peptized state. The powder mixture is then contacted with water or acidulated water. The charge-binding agent-water mixture is so achieved that the pH of the final composition is lower than 4, in such proportions that the dispersion rate of the final composition is from 10 to 60%.

According to another method, the powdered charge and the binding agent, as alumina suspension or dispersion, can be admixed, under stirring, in such proportions that the dispersion rate of the composition is from 10 to 60% and the pH of the final composition lower than 4.

The present invention hence concerns the use of a catalyst whose manufacture is essentially characterized in that at least a portion of the active phase, or the precursor thereof which functions as a source of the metals in the active phase, as discussed on pages 13 and 14 below, is introduced during the shaping of the carrier, i.e. during the admixture of the binding agent with the charge. The active phase generally comprises at least one metal from group VIII, generally present in the catalyst as metal, particularly when the catalyst is a noble metal of the platinum group, and optionally at least one other metal, generally as an oxide or sulfide, to promote the activity of the first metal. At least a portion of the active phase, as explained more in detail hereinafter, will be introduced either in the binding agent of the carrier or in the charge of the carrier or both in the charge and in the binding agent. When the whole active phase is not introduced during the manufacture of the carrier, the complement of active phase will be introduced later on the carrier, according to the conventional methods.

More precisely, at least said portion of the active phase, or its precursor, is introduced (α) either in the charge,
(β) or in the binding agent,
(γ) or both in the charge and the binding agent.

Said portion of active phase may be added to the binding agent and/or to the charge during the mixture of the charge with the binding agent.

With respect to the addition of active phase itself, in major part in the binding agent, the operation can be performed:

(1)—Either by impregnation of the binding agent in a conventional way (dry or wet) by means of an acidulated aqueous solution of a metal salt or compound or of at least one metal of the active phase.

For example, a method consists of impregnating the carrier by means of solutions of compounds of the metals to be introduced. Either a common solution of these metals or a separate solution for each metal or each group of metals can be used.

Examples of metal compounds other than those of the nobel metals from group VIII (platinum family) are for example the nitrates, chlorides, bromides, fluorides, sulfates or acetates of these metals or still any other salt or oxide of these metals soluble in water or hydrochloric acid (e.g. chloroplatinate). Also organic complexes containing these metals are convenient.

The noble metals from group VIII and particularly platinum may be used in any other known form, for example, for platinum, hexachloroplatinic acid, ammonium chloroplatinate, platinum sulfide, sulfate or chloride. Ruthenium, for example, may be used in any known form, for example as chloride, bromide, sulfate or sulfide or still, for example, as acetylacetonate, etc .
. . .

The halogen, when present in the catalyst, may originate from one of the above-mentioned halides or may be introduced as hydrochloric or hydrofluoric acid, ammonium chloride, ammonium fluoride, chlorine gas or hydrocarbon halide, e.g $CCl_4$, $CHCl_3$ or $CH_3Cl$.

A first method of manufacture consists for example of impregnating the binding agent or the charge of the carrier by means of an aqueous solution of nitrate or other compound of a metal other than those from group VIII, then a second impregnation will be performed by means of a solution containing at least one group VIII metal, (for example, a solution of hexachloroplatinic acid, when using platinum).

Another method consists of impregnating the carrier by means of a solution containing together:

(α) the one or more metals from group VIII family (e.g. hexachloroplatinic acid),
(β) the one or more metals other than those from group VIII (e.g. a chloride, bromide, fluoride, sulfate or acetate of the selected metal or still any other salt of the selected metal soluble in water or in hydrochloric acid or in any other suitable solvent (e.g chloroplatinate, acetylacetonate) and
(γ) optionally chlorine or fluorine.

Still another method consists of introducing the metal elements in as many successive impregnations as metal elements to introduce in the catalyst; for example successively:

a metal from group VIII, by means of a solution containing the same,
one or more metals from group VIII (when the catalyst comprises several metals) by means of a solution containing the same, and
finally the one or more other additional metals.

Of course, the order of the above-mentioned impregnations is not compulsory as above stated and may be different.

(2)—or by co-gelation of the alumina powder forming the binding agent with the active phase introduced as colloidal suspension, (3)—or during the manufacture of the binding agent by co-precipitation of an alumina salt with a salt of the active phase. The binding agent is advantageously dried at a temperature lower than 300° C.

The addition of the active phase during the admixture of the charge with the binding agent, preferably with introduction of the active phase in the binding agent or in the charge, may be effected:

(a) in several steps, or (b) in a single step.

(a) in several steps

When it is desired to introduce the active phase preferentially in the binding agent, the method consists of first introducing the binding agent in aqueous solution, then a salt of the active phase and then the charge, previously saturated with a suitable salt, so that the salt of the active phase does not penetrate into the charge (the salt thus permitting to inhibit the charge may be, for example, a volatile salt such as nitrate, chloride, sulfate, ammonium salt, amine, hydroxylamine, hydroxylamine chloride, ammonium acetate, etc . . . ).

When it is desired to introduce the active phase preferentially into the charge, the method consists of introducing the charge, then the one or more salts of the active phase, and then the binding agent inhibited by a salt as above described.

(b) in a single step:

In order to preferentially introduce the active phase in the binding agent or in the charge, either the charge or the binding agent is inhibited as above indicated, by means of a convenient salt, the active phase being thus fixed either in the binding agent, when the charge is inhibited, or in the charge, when the binding agent is inhibited.

For introducing preferentially the active phase in the binding agent, the latter may have a specific surface of about 150–600 m2/g and the charge any specific surface but so selected that the ratio of the respective specific surface of the binding agent and the charge be higher than about 1.5. Thus the salt of the active phase is preferably fixed on the binding agent.

Conversely, for introducing preferentially the active phase into the charge, the latter may have a specific surface of about 100–600 m2/g, the binding agent having such a specific surface that the ratio of the respective specific surface of the charge and of the binding agent be higher than about 1.5.

When the active phase comprises several metals, it is possible to introduce separately each metal in the binding agent or in the charge by any one of the above described methods.

Simultaneously with the introduction, in one or more steps, of at least a portion of the active phase, the binding agent and the charge can be shaped by any convenient means and for example:

(a) either by extrusion, (b) or by the so-called method of the bowl granulator (or revolving bowl or revolving granulator, etc . . . ), (c) or by the so-called oil-drop method (drop falling in oil).

Then the yet non introduced portion of active phase, if any, can be added to the catalyst mass after shaping of the carrier.

Generally, it has been observed that the introduction into the charge of the active phase, or of a part thereof, imparted improved catalytic properties (selectivity, yield) to the final catalyst and it has been observed that the introduction of the active phase or a portion thereof, into the binding agent, imparted to the final catalyst a higher mechanical strength than usually (particularly desirable for use as moving bed), hence of a longer life time.

Thus, according to the invention, the catalyst carrier of alumina base to which an active phase, consisting for example of at least one metal from group VIII of the periodic classification of elements (e.g cobalt, iron, nickel or a noble metal of the platinum family), must be added, is prepared for example and preferably, either by an extrusion method or by the so-called method of bowl granulator, of revolving granulator (or an equivalent method such as that of the revolving bowl, etc . . . ) or still by the so-called oil-drop method, the method of manufacture being characterized in that at least a portion of the active phase is added either into the charge or in the binding agent or both in the charge and in the binding agent.

Generally, the active phase contains at least one metal from group VIII and at least one metal promoter; then, three preferred methods may be considered for shaping the binding agent and/or the charge and said active phase part, during the manufacture of the carrier, depending on whether said active phase part is the group VIII metal and/or the metal promoter.

Hereinafter, the terms "major part of the oxide" of the promoter (or of the promoter oxides, when several promoters are used) or "major part of the group VIII metal" (or group VIII metals when several metals are present in the catalyst) will be used. By "major part", it is meant at least 55% by weight of the total amount of oxide (or oxides, when several oxides are involved), or 55% by weight of the totality of the group VIII metal, expressed as metal (or group VIII metals when several methods are involved), present in the final catalyst, i.e. in the catalyst ready for use.

It is recalled that if all the metal oxide(s) promoters and/or if all the metal or metals from group VIII have not been introduced by the indicated method, this means, on the one hand, that this or these oxide promoters, not introduced by the indicated method, are introduced in the charge or at a later stage (i.e. after the manufacture of the carrier) and, on the other hand, that this or these metals from group VIII, not introduced by the indicated method, are introduced in the charge or at a later stage (i.e. after the manufacture of the carrier).

For the shaping of the carrier, i.e. for admixing the binding agent with the charge, a portion of the active phase being simultaneously added, preferentially in the binding agent or in the charge, various techniques are possible during the admixing step:

(I) The method of shaping the charge-binding agent mixture is that of the oil drop. The metal from group VIII may be introduced into the charge or into the binding agent. But it is also possible to add it at a later stage (i.e. during the manufacture of the carrier, admixed with a portion of the active phase, in conformity with the invention) by any adequate conventional method, for example by impregnation. The so-called promoter or additional metal, generally introduced as one of its oxides, is added either to the binding agent or to the charge, or both to the binding agent and to the charge, or also, but generally in minor part, at the end of the carrier-active phase admixture, by any adequate method, for example by impregnation.

In a preferred manner, six operating methods (1 to 6) are considered:

Method 1: The major part of the metal oxide or oxides promoters is introduced into the binding agent and at least a portion, for example the major part, of the one or more metals from group VIII, is introduced into the binding agent.

Method 2: The major part of the metal oxide or oxides promoters is introduced into the charge and at least a portion, for example the major part, of the one or more metals from group VIII is introduced into the binding agent. It must be observed that the one or more metal oxide promoters, eventually not introduced as above indicated, are introduced into the binding agent or after the manufacture of the carrier, and the one or more group VIII metals, eventually not introduced as above indicated, are introduced into the charge or after the catalyst manufacture.

This type of observation relating to method 1 and method 2 is also valid for other methods 3 to 6 and, accordingly, it will not be repeated in the following description, since it is well understood that, when a minor portion of the one or more oxides promoters or of the one or more metals from group VIII is not introduced in conformity with the indicated method, this or these minor portions are then introduced by any other way.

Method 3: The major part of the metal oxide or oxides promoters is introduced into the binding agent and at least a part, for example the major part, of the one or more metals from group VIII is introduced into the charge.

Method 4: The major part of the oxide or oxides promoters is introduced into the charge and at least a part, for example the major part, of the one or more metals from group VIII, is introduced into the charge.

Method 5: The major part of the one or more oxides promoters is introduced into the binding agent and the one or more metals from group VIII are introduced at a later stage, after the manufacture of the carrier, for example by conventional impregnation.

Method 6: The major part of the one or more oxides promoters is introduced into the charge and the one or more metals from group VIII are subsequently introduced after the manufacture of the carrier, for example by conventional impregnation.

(II) The admixture is achieved by the method of revolving bowl granulator type.

Here two methods no. 7 and 8 are essentially selected for the introduction of at least said part of the active phase into the carrier, particularly when the catalyst contains a metal from group VIII as promoter.

A first method (no. 7) consists of introducing the major part of the one or more metal oxides (called promoters) into the binding agent. A second method (no. 8) consists of introducing at least a part, for example the major part, of the one or more metal oxides promoters into the charge. For these two methods, the totality of the one or more metals from group VIII is preferably introduced subsequently, after the preparation of the carrier, for example by impregnation.

(III) The carrier-active phase mixture is obtained by a method of the extrusion type.

Several methods are possible which are the same six methods 1 to 6 described for the oil drop technique (dropping of the product in oil).

When the catalyst, prepared in the above-explained manner, is used in reforming reactions or reactions for producing aromatic hydrocarbons, it is shaped: either
    by the method of the "revolving bowl granulator", or
    by the "extrusion" method, or preferably
    by anyone of the 6 "oil-drop" methods.

Concerning more particularly the oil-drop method, the procedure will be preferably as follows:

According to a first process, the drops of binding agent and charge are introduced into a liquid non miscible with water, in such a manner that the drops form substantially spherical particles. These particles are simultaneously coagulated and/or subsequently put in spheroidal shape by a gelling agent which removes the stabilizing ligands. Also simultaneously, at least a portion of the active phase of the catalyst is added, either in the binding agent or in the charge or both in the charge and in the binding agent.

The liquid non miscible with water may be such that the drops fall (density of the liquid lower than the density of the drops) or rise (density of the liquid higher than the density of the drops) in the treatment liquid; examples of liquids non miscible with water, suitable for the process of the invention, are particularly crude oil, kerosene, dodecylbenzene, trichloroethylene, perchloroethylene, organic solvents, hydrocarbons and inorganic oils generally.

The gelling agent which removes the stabilizing ligands may particularly be ammonia, an ammonia solution, ammonium carbonate, long-chain amines (particularly those sold under trade mark "Primene"), hexamethylene tetramine, urea.

The resultant drops are recovered from the medium used for their shaping and/or coagulation.

According to a preferred embodiment, the drops of the mixture are introduced into a column containing an upper phase consisting of crude oil and a lower aqueous phase consisting of an ammonia solution. The shaping takes place in the upper phase and the gelation essentially in the lower phase. The temperature of the crude oil is generally close to room temperature. The pH of the ammonia solution must be maintained above 9. The residence time of the drops in the ammonia solution is a few minutes and generally less than about 15 minutes. In these conditions, the recovered balls are sufficiently hard and are not deformed by subsequent handlings. Two new advantages of the process of the invention appear particularly for said step of spheroidal shaping and gelation: the shaping is performed at room temperature and the gelation is performed very quickly, thus it is not absolutely necessary to proceed to a subsequent ageing of the balls in a basic solution, the latter having a sufficient strength, after a short residence time in the ammonia phase.

According to a second process, the drops of the mixture are introduced (suspended) into a non miscible liquid, liable to remove water from the drops. This non miscible liquid extracts water from the drops and causes their gelation in spheroidal shape. For example, 2-ethyl-1-hexanol or a long-chain aliphatic alcohol, sold under trade mark Octylol, can be used.

According to a third process, the mixture is admixed with at least one hydrosoluble monomer whose non cross-linked polymer is soluble in water or forms a gel. The resultant mixture is then dispersed, as drops, in a hot fluid medium where a substantial polymerization of the monomer occurs. The monomer may be an acrylic compound of general formula:

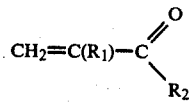

wherein $R_1$ is H or a methyl radical, $R_2$ is O $R_3$ or N $R_3R_4$, in which $R_3$ and $R_4$ represent H or a hydrophylic radical, particularly a hydroalkyl radical containing 1 or 2 carbon atoms, or a methoxymethyl radical. The main steps of the process have been described, in particular, in the French Pat. Nos. 2 261 056 and 2 261 057.

Independently from the use of a particular process, the obtained balls are then separated from their gelatin medium and then dried and calcined at a temperature of about 550°–1100° C.

The resultant balls have a total pore volume of 0.30–1.7 cc/g their micro pore volume (consisting of pores of a diameter lower than 0.06 micron), being 0.5–1 cc/g, their macropore volume (consisting of pores of a diameter larger than 0.06 micron) being 0.05–0.7 cc/g, the average diameter of the macropores being 0.1–10 micron. The specific surface of said balls is about 80–350 m2/g (BET method, products dried at 110° C.), their breaking strength being higher than 1 kg.

With respect more particularly to the extrusion method or the revolving granulator method, the manufacture of the catalyst is conducted more particularly as follows:

(1) during an optional first step, the material used as carrier is washed.

(2) during a second step, the material used as carrier is dried by any adequate method, for example by stove-drying, so as to obtain a powder which keeps the same structure as the starting material and which, after drying, is characterized by a loss on heating of about 15–40% at 1000° C.

(3) during an optional third step, the material is washed and dried.

(4) at this stage, before the subsequent steps, it is often preferable to roast at least partially the dried powder. Thus, 20–80% of the alumina powder can be subjected to a temperature of about 200°–800° C. and the roasted powder can be admixed with the non roasted powder. Here the advantage is to impart to the products to be obtained, a macro-porosity by means of two-phase products. More precisely, it is desired to obtain here, after admixture of the roasted powder with non-roasted powder, a powder of particle diameter ranging from 1 to 50 microns and having a critical macro-porosity corresponding to pores of a diameter larger than about 600 Å.

(5) then, the resultant powder is shaped:

(a) either by extrusion, (b) or by means of a revolving bowl-granulator or by any equivalent means, this shaping being characterized by the simultaneous addition of at least a portion of active phase into the binding agent (dispersed alumina) or into the charge (non dispersed alumina).

When proceeding by extrusion, the operation is as follows:

For a period from 5 minutes to 5 hours, the powder is mixed in the presence of water or acidulated water, the water or acidulated water containing at least a portion of the catalyst active phase (i.e metal oxides and/or precious metals).

The amount of water or of acidulated water is, by weight, 50–89% of the powder weight.

The resultant paste is extruded by any adequate method, for example with a single-screw or double-screw extruding machine or any other machine, through a drawing plate.

The resultant extrudates are dried at a temperature generally lower than 350° C. so that the loss on heating of the resultant solids be about 15–40%.

At this stage, the portion of active phase not yet admixed to the carrier is optionally and conventionally introduced and the operation terminates with a drying, for example at a temperature lower than 350° C.

Then optionally, the extrudates are subjected to a hydrothermal treatment in neutral, acid or basic medium at a temperature of 80°–500° C., so that the amorphous structures develop into boehmite or pseudo-boehmite structures and lead to improved mechanical properties.

The obtained extrudates are roasted at a temperature generally from 350° to 1000° C.

The sequential order of these two latter steps may be reversed.

When operating according to the revolving granulator method or similar (bowl granulator or other: revolving plate, rotary bowl, etc . . . ), the operation is conducted as follows: on the one hand, the powder is caused to run on the granulator and, on the other hand, an aqueous solution or an acidulated aqueous solution is simultaneously introduced by pouring or by pulverization, on the granulator. This solution contains at least a part of the active phase of the catalyst (i.e metal oxides and/or precious metals). Generally, the bowl granulator or the granulator is wet while the powder rotates. The powder agglomerates by sticking of the present powder particles. The particles are removed according to usual methods, for example by ejection from the bowl granulator, obtained by centrifugation and then they are dried and roasted as above-explained for the so-called extrusion method (with optional introduction, as above explained, of the portion of active phase not yet introduced on the carrier).

An improvement in the method would consist of feeding the granulator with a portion of powder (about 0–40% thereof) already diluted with the aqueous solution or preferably with the acidulated aqueous solution. (It is so possible to dilute a portion of the powder in the acid which is used to form said acidulated aqueous solution).

EXAMPLES

The following non-limitative examples illustrate the invention without however limiting the scope thereof:

EXAMPLE 1

Several catalysts with an alumina base, containing platinum and various additional metals, are prepared in view of subsequently testing their capacity to be used in reforming reactions.

Six catalysts are prepared according to the following methods: Catalysts $A_1$, $B_1$, $C_1$, $D_1$, $E_1$, and $F_1$ (not conforming with the invention).

Catalysts $A_1$ to $F_1$ contain by weight 0.2% platinum and 1.18% chlorine and further contain:

For catalyst $A_1$: 0.5% rhenium
For catalyst $B_1$: 0.5% tin
For catalyst $C_1$: 0.5% thallium
For catalyst $D_1$: 0.5% indium For catalyst $E_1$: 0.5% titanium
For catalyst $F_1$: 0.5% iridium Catalyst $A_1$ is prepared by adding to 100 grams of γ alumina (specific surface: 280 m2/g):
on the one hand, 65 cc of an aqueous solution containing: 1.90 g of concentrated hydrochloric acid (density 1.19) 10 g of an aqueous solution of chloroplatinic acid of 2% platinum content by weight,
on the other hand, 51 cc of a perrhenic acid solution at 0.98% by weight rhenium content.

The contact is maintained for 10 hours and then drying is performed at 100° C. in a stove, for 6 hours; then calcination is conducted in a dry air stream for 2 hours at 380° C. and then for 2 hours at 530° C. Reduction is effected in a dry hydrogen stream (activated alumina) for 2 hours at 450° C.

Catalysts $B_1$, $C_1$, $D_1$, $E_1$ and $F_1$ have been prepared by adding to 100 g of alumina:
on the one hand, 65 cc of an aqueous solution containing:
1.90 g of concentrated hydrochloric acid (density 1.19)
10 g of an aqueous solution of chloroplatinic acid having 2% by weight platinum content, and
on the other hand, 100 cc of an aqueous solution containing:
2.5 g of a 20% tin acetate solution for catalyst $B_1$,
2.5 g of thallium acetate solution having a 20% by weight thallium content for catalyst $C_1$,
10.75 g of titanium trichloride solution containing 15% by weight of titanium chloride for catalyst $E_1$,
1.87 g of indium nitrate for catalyst $D_1$, and
1.74 cc of a 2.3% by weight aqueous solution of chloroiridic acid, for catalyst $F_1$.

The obtained catalysts are dried, calcined and reduced as indicated for catalyst $A_1$.

These catalysts have a specific surface of 270 m2/g.

Catalysts $A_2$ to $F_2$ (not conforming with the invention)

An ultra-fine boehmite sol is prepared as follows:
A cake of alumina gel is prepared by continuous precipitation of a sodium aluminate solution whose $Al_2O_3Na_2O$ ratio by weight is about 1.08, at a concentration of 100 g/l, expressed as $Al_2O_3$, with a nitric acid solution at such a concentration that the suspension contains about 50 g/l of alumina, expressed as $Al_2O_3$, and the $NO_3/Al_2O_3$ molecular ratio is 0.16. The precipitation pH is then about 9. The so-prepared gel cake is dried, filtered and washed. It is then treated for 24 hours at 115° C. in a shaked autoclave. The resultant product is a paste containing 12% of alumina, expressed as $Al_2O_3$.

The specific surface, measured by the BET method, of said product, dried in a stove at 110° C., is about 300 m2/g. The geometrical surface of this product, measured after drying by dispersion in isopropanol, azeotropic distillation and then evaporation of isopropanol, is about 550 m2/g.

The photograph of this product, obtained with an electronic microscope, shows that it consists of ultra-fine boehmite, entirely fibrillar, composed of monocrystals shaped as elongate and very narrow lathes, often forming bundles, the microcrystals having a longitudinal size of about 500–1000 Å. When considering the microcrystals as cylinders, it can be deduced from the specific surface, measured by the BET method, that these microcrystals have an average diameter of 55 Å. The Debye-Scherrer diagram of this product shows the absence of reflections (hkl), a halo (012) and a clear reflection (200).

The resultant sol, which constitutes the binding agent, is contacted with an amount of acidulated water so selected that the pH of the final composition be lower than 4 and that the dispersion rate of the composition be 30%. The binding agent is admixed with a γ alumina charge, as powder. The amounts of binding agent and charge are so selected that the resultant carrier contains, by weight, 30% of binding agent and 70% of charge. The charge-binding agent mixture is effected as follows:

Drops of the mixture of dispersed alumina (binding agent) and non dispersed alumina (charge) are formed by means of calibrated tubes of about 2.5 mm internal diameter. The drops fall into a column of 600 mm diameter, containing an oil layer of about 6 cm, floating above an ammonia solution at about 20 g/l concentration. The residence time of the particles in the ammonia solution is about 2 minutes. The drops become round in the oil and gel in the ammonia solution. The recovered balls are very hard and undergo without deformation the transfer operations. They are then dried and calcined at 950° C. for one hour. Their diameter is about 3.5 to 4 mm.

On the carrier so prepared by the oil-drop method, platinum and the additional metals are added according to the techniques indicated for catalysts $A_1$ to $F_1$, so as to obtain the same metal contents as in catalyst $A_1$ to $F_1$.

Catalysts $A_3$ to $F_3$ (conforming with the invention)

The manufacture of catalysts $A_2$ to $F_2$ is repeated but by adding the solution containing the additional metal (perrhenic acid or tin acetate or thallium acetate or titanium trichloride or indium nitrate), or chloroiridic acid, at the beginning and then during operation by the oil-drop method, said solution being introduced in the binding agent (dispersed boehmite). Platinum is introduced subsequently, as for catalyst $A_2$ to $F_2$.

Catalysts $A_4$ to $F_4$ (not conforming with the invention)

A sol of ultra-fine boehmite is prepared according to the technique used for catalysts $A_2$ to $F_2$. The mixture of binding agent (dispersed boehmite) and charge (non dispersed boehmite) is extruded from its paste with water and nitric acid: thus, a homogeneous paste is prepared after admixture, for 3 hours, on the one hand, of 500 g of alumina and, on the other hand, of a solution containing 250 cc of distilled water and 20 cc of 0.001M nitric acid.

The paste is extruded through a drawing plate of 1.5 mm, on an extruder of the piston type.

The extrudates are dried at 300° C. so that the loss on heating of the obtained solid is about 20%.

To the resultant catalyst mass, platinum and additional metals are added according to the technique used for manufacturing catalysts $A_1$ to $F_1$.

Catalysts $A_5$ to $F_5$ (conforming with the invention)

The manufacture of catalysts $A_4$ to $F_4$ is repeated but with the addition of the solution containing the additional metal into the binding agent (dispersed boehmite) during the extrusion.

Platinum is added subsequently, as for catalysts $A_4$ to $F_4$.

Catalysts $A_6$ to $F_6$ (not conforming with the invention)

An ultra-fine boehmite sol is prepared according to the technique used for the preparation of the catalysts $A_2$ to $F_2$. The mixture of binding agent (dispersed boehmite) and charge (non dispersed boehmite) is agglomerated by means of a revolving granulator: 500 grams of powder are poured on the granulator and simultaneously an aqueous solution containing 250 cc of distilled water and 20 cc of 0.001M nitric acid is introduced on the granulator.

The granulator or bowl granulator is thus wet as the powder rotates.

The powder agglomerates by sticking of the present powder particles.

The particles are removed by ejection from the bowl granulator by centrifugation and then dried at 300° C. so that the loss on heating of the obtained solids be about 20%.

To the resultant catalyst mass, platinum and additional metals are added according to the technique used for the preparation of catalysts $A_1$ to $F_1$.

Catalyst $A_7$ to $F_7$ (conforming with the invention)

The manufacture of catalysts $A_6$ to $F_6$ is repeated but with the addition of the additional metal solution to the binding agent (dispersed boehmite), during the granulation step.

Platinum is added subsequently, as for catalyst $A_6$ to $F_6$.

EXAMPLE 2

All the catalysts, before use, are reduced in the presence of hydrogen, as for catalysts $A_1$ to $F_1$.

In view to obtain a gasoline having a clear octane number of 103, a naphtha is treated, whose characteristics are as follows:

| ASTM distillation | 80–160° C. |
|---|---|
| composition: aromatic hydrocarbons | 7% by weight |
| naphthenic hydrocarbons | 27% by weight |
| paraffinic hydrocarbons | 66% by weight |
| "clear Research" octane number | about 37. |
| average molecular weight | 110 |
| density at 20° C. | 0.782 |

This naphtha passes, with recycle hydrogen, over catalysts $A_1$ to $F_1$, $A_2$ to $F_2$, $A_3$ to $F_3$, $A_4$ to $F_4$, $A_5$ to $F_5$, $A_6$ to $F_6$, $A_7$ to $F_7$.

The operation is conducted continuously in a moving bed reactor. The operating conditions are as follows:

| pressure | 1 MPa |
|---|---|
| temperature | 530° C. |
| molar ratio $H_2$/hydrocarbons | 8 |
| naphtha volume/catalyst volume/hour | 1.65 |

Table I below indicates, after 200 hours, the $C_5+$ yield and the hydrogen percentage contained in the recycled gas.

A significant gain of yield and of recycle hydrogen is obtained when the catalyst is prepared in conformity with the invention (catalysts $A_3$ to $F_3$, $A_5$ to $F_5$ and $A_7$ to $F_7$) with a preference for catalysts $A_3$ to $F_3$, prepared by the so-called oil-drop method.

TABLE 1

| Catalyst | Precious metal | Promotor metal | Yield $C_5+$ (weight) | Recycle gas % $H_2$ (molar) |
|---|---|---|---|---|
| $A_1$ | Platinum | rhenium | 74.9 | 75.3 |
| $A_2$ | " | " | 75.0 | 75.3 |
| $A_3$ | " | " | 75.9 | 76.5 |
| $A_4$ | " | " | 74.9 | 75.4 |
| $A_5$ | " | " | 75.8 | 76.4 |
| $A_6$ | " | " | 75.0 | 75.2 |
| $A_7$ | " | " | 75.7 | 76.2 |
| $B_1$ | " | Tin | 76.6 | 76.1 |
| $B_2$ | " | " | 76.6 | 76.1 |
| $B_3$ | " | " | 77.6 | 77.3 |
| $B_4$ | " | " | 76.5 | 76.1 |
| $B_5$ | " | " | 77.5 | 77.2 |
| $B_6$ | " | " | 76.5 | 76.1 |
| $B_7$ | " | " | 77.4 | 77.2 |
| $C_1$ | Platinum | thallium | 74.9 | 75.0 |
| $C_2$ | " | " | 74.9 | 75.1 |
| $C_3$ | " | " | 75.9 | 76.2 |
| $C_4$ | " | " | 75.0 | 75.1 |
| $C_5$ | " | " | 75.8 | 76.1 |
| $C_6$ | " | " | 74.9 | 75.0 |
| $C_7$ | " | " | 75.7 | 76.0 |
| $D_1$ | " | Indium | 75.6 | 75.1 |
| $D_2$ | " | " | 75.5 | 75.1 |
| $D_3$ | " | " | 76.5 | 76.1 |
| $D_4$ | " | " | 75.5 | 75.2 |
| $D_5$ | " | " | 76.4 | 76 |
| $D_6$ | " | " | 75.5 | 75.1 |
| $D_7$ | " | " | 76.2 | 75.9 |
| $E_1$ | Platinum | Titanium | 76.6 | 76.2 |
| $E_2$ | " | " | 76.7 | 76.2 |
| $E_3$ | " | " | 78.1 | 77.4 |
| $E_4$ | " | " | 76.7 | 76.2 |
| $E_5$ | " | " | 77.9 | 77.3 |
| $E_6$ | " | " | 76.6 | 76.1 |
| $E_7$ | " | " | 77.8 | 77.2 |
| $F_1$ | Platinum & Iridium | | 75.2 | 74.9 |
| $F_2$ | Platinum & Iridium | | 75.3 | 75.0 |
| $F_3$ | Platinum & Iridium | | 76.5 | 76.0 |
| $F_4$ | Platinum & Iridium | | 75.2 | 74.9 |
| $F_5$ | Platinum & Iridium | | 76.4 | 75.9 |
| $F_6$ | Platinum & Iridium | | 75.3 | 74.9 |
| $F_7$ | Platinum & Iridium | | 76.2 | 75.8 |

EXAMPLE 3

Several catalysts with an alumina carrier are now prepared which all contain by weight:
0.2% platinum,
0.04% iridium,
0.5% indium,
0.18% chlorine.

Anyone of the above-mentioned techniques can be used.

Thus, a catalyst G, not conforming with the invention, is prepared by using the same technique as for the preparation of catalysts $A_2$ to $F_2$, i.e. they are prepared from an ultrafine boehmite sol shaped by oil-drop, the metals being subsequently introduced by conventional impregnation.

A catalyst H is also prepared, as above, by introducing however indium in the binding agent, as for catalysts $A_3$ to $F_3$.

A catalyst I is also prepared by introducing the totality of the metals (indium, platinum and iridium) into the binding agent.

Finally, a catalyst J is prepared by introducing indium and one half of the chloroplatinic and chloroiridic acids solutions in the binding agent and the other half of said solutions subsequently, after shaping of the binding agent and the charge, by conventional impregnation.

The results, in the operating conditions of example 2, are given in TABLE II.

TABLE II

| CATA-LYST | PRECIOUS METAL | PRO-MOTER METAL | YIELD OF $C_5+$ (WEIGHT) | GAS RECYCLE % $H_2$ (molar) |
| --- | --- | --- | --- | --- |
| G | Platinium & Iridium | Indium | 79.5 | 79.1 |
| H | Platinium & Iridium | Indium | 80.4 | 79.9 |
| I | Platinium & Iridium | Indium | 80.6 | 80.2 |
| J | Platinium & Iridium | Indium | 80.9 | 80.6 |

What is claimed as this invention is:

1. In a catalytic reforming process wherein a hydrocarbon feed is contacted under reforming conditions with a catalyst consisting essentially of (a) a carrier consisting essentially of a major part of alumina and, (b) an active phase containing at least one metal from group VIII and at least one additional metal or promoter, wherein the carrier is obtained by a method comprising admixing a binding agent consisting essentially of a major part of alumina base, with a charge, consisting essentially of a major part of alumina base, shaping and drying the resultant mixture, the proportion by weight of the binding agent amounting to 15–40% of the total carrier, the proportion by weight of the charge amounting to 60–85% of the total carrier, the alumina binding agent consisting essentially of dispersed alumina and 0–30% of non-dispersed alumina, the alumina charge consisting essentially of non-dispersed alumina and 0–10% of dispersed alumina the dispersion rate of the composition resulting from the mixture of the binding agent with the charge being from 10 to 60%, the improvement wherein in said method at least a portion of a source of said additional metal is introduced into the binding agent or into the charge prior to completion of the formation of said carrier.

2. A method according to claim 1, comprising simultaneously mixing
   (a) the said source of the additional metal
   (b) the binding agent and
   (c) the charge, the said source of the additional metal penetrating into the binding agent, the charge having previously been saturated with a suitable salt so that the said source of the additional metal) does not penetrate into the charge.

3. A method according to claim 1, comprising simultaneously mixing
   (a) the said source of the additional metal,
   (b) the binding agent and
   (c) the charge, the said source of the additional metal penetrating into the charge, the binding agent having previously been saturated with a salt so that the said source of the additional metal does not penetrate into the binding agent.

4. A method according to claim 1, wherein the source of the additional metal is added to the charge before admixture of the charge and the binding agent.

5. A method according to claim 1, wherein the source of the additional metal is added to the binder before admixture of the charge and the binding agent.

6. A method according to claim 2, wherein the method of admixing the binding agent with the charge is selected from the oil-drop method, the extrusion method and the revolving bowl granulator method.

7. A method according to claim 3, wherein the method of admixing the binding agent with the charge is selected from the oil-drop method, the extrusion method and the revolving bowl granulator method.

8. A method according to claim 6, wherein the oil-drop or the extrusion method is used, and wherein the said source of the additional metal is introduced into the binding agent during admixture of the charge and the binding agent, and wherein the group VIII metal is introduced into the carrier subsequent to admixture.

9. A method according to claim 7, wherein the oil-drop or the extrusion method is used, and wherein the said source of the additional metal is introduced into the charge during admixture of the charge and the binding agent, and wherein the group VIII metal is introduced into the carrier subsequent to admixture.

10. A method according to claim 2, wherein the revolving bowl granulator method is used, and wherein the said source of the additional metal is introduced into the binding agent during admixture of the charge and the binding agent, and wherein the group VIII metal is introduced into the carrier subsequently to admixture.

11. A method according to claim 3, wherein the revolving bowl granulator method is used, and wherein the said source of the additional metal is introduced into the charge during admixture of the charge and the binding agent, and wherein the group VIII metal is introduced into the carrier subsequently to admixture.

12. A catalytic reforming process for the production of gasoline from naphtha wherein the catalyst employed is that of claim 1.

13. A process for the production of gasoline according to claim 12, comprising treating with said catalyst a charge comprising naphtha, wherein the charge is treated at a temperature of about 430°–600° C. and absolute pressure of 0.1–5 MPa, and wherein the hourly velocity of liquid charge per volume of catalyst is about 0.1–10, and the molar ratio of hydrogen to charge is about 1–20.

14. A process according to claim 13, wherein gasoline having a clear octane number of at least 100 is produced, and wherein the charge comprises naphtha distilling from about 60°–200° C.

15. A method according to claim 1, wherein the shaped and dried carrier is calcined.

* * * * *